United States Patent
Song (10) Patent No.: US 11,636,314 B2
(45) Date of Patent: Apr. 25, 2023

(54) TRAINING NEURAL NETWORKS USING A CLUSTERING LOSS

(71) Applicant: GOOGLE LLC, Mountain View, CA (US)

(72) Inventor: Hyun Oh Song, Seoul (KR)

(73) Assignee: Google LLC, Mountain View, CA (US)

( * ) Notice: Subject to any disclaimer, the term of this patent is extended or adjusted under 35 U.S.C. 154(b) by 747 days.

(21) Appl. No.: 16/349,888

(22) PCT Filed: Nov. 15, 2017

(86) PCT No.: PCT/US2017/061853
§ 371 (c)(1),
(2) Date: May 14, 2019

(87) PCT Pub. No.: WO2018/093935
PCT Pub. Date: May 24, 2018

(65) Prior Publication Data
US 2020/0065656 A1    Feb. 27, 2020

Related U.S. Application Data

(60) Provisional application No. 62/422,555, filed on Nov. 15, 2016.

(51) Int. Cl.
*G06N 5/04* (2006.01)
*G06N 3/04* (2023.01)
(Continued)

(52) U.S. Cl.
CPC ......... *G06N 3/0472* (2013.01); *G06K 9/6218* (2013.01); *G06N 3/08* (2013.01); *G06N 5/04* (2013.01)

(58) Field of Classification Search
None
See application file for complete search history.

(56) References Cited

U.S. PATENT DOCUMENTS

| 5,065,339 A | 11/1991 | Vassiliadis et al. |
| 2004/0024750 A1 | 2/2004 | Ulyanov et al. |

(Continued)

FOREIGN PATENT DOCUMENTS

| CN | 1672171 A | 9/2005 |
| CN | 103530689 A | 1/2014 |

(Continued)

OTHER PUBLICATIONS

Rizi, et al., Properties of Vector Embeddings in Social Networks, Algorithms Oct. 2017, 109, 2017, pp. 1-15 (Year: 2017).*

(Continued)

*Primary Examiner* — Wilbert L Starks
(74) *Attorney, Agent, or Firm* — Fish & Richardson P.C.

(57) ABSTRACT

Methods, systems, and apparatus, including computer programs encoded on computer storage media, for training a neural network. One of the methods includes obtaining a batch of training items and a ground truth assignment; processing the training items in the batch using the neural network to generate respective embeddings for each of the training items; and adjusting the current values of the network parameters by performing an iteration of a neural network training procedure to optimize an objective function that penalizes the neural network for generating embeddings that do not result in, for each possible clustering assignment other than the ground truth assignment, the oracle clustering score being higher than a clustering score for the possible clustering assignment by at least a structured margin between the possible clustering assignment and the ground truth assignment.

12 Claims, 3 Drawing Sheets

(51) Int. Cl.
G06K 9/62 (2022.01)
G06N 3/08 (2023.01)

(56) References Cited

U.S. PATENT DOCUMENTS

2013/0144818 A1  6/2013  Jebara et al.
2014/0195466 A1  7/2014  Phillipps et al.

FOREIGN PATENT DOCUMENTS

| CN | 103914735 A | 7/2014 |
| CN | 104169948 A | 11/2014 |
| CN | 104299035 A | 1/2015 |
| CN | 105160397 A | 12/2015 |
| CN | 105701571 A | 6/2016 |
| CN | 105940395 A | 9/2016 |
| CN | 106056213 A | 10/2016 |

OTHER PUBLICATIONS

Abadi et al., "TensorFlow: Large-Scale Machine Learning on Heterogeneous Distributed Systems", arXiv:1603.04467v2, Mar. 16, 2016, 19 pages.
Bell et al., "Learning visual similarity for product design with convolutional neural networks", SIGGRAPH, 2015, 10 pages.
Bhat, "K-Medoids Clustering Using Partitioning Around Medoids for Performing Face Recognition", International Journal of Soft Computing Mathematics and Control, Aug. 1, 2014, 12 pages.
Bromley et al., "Signature Verification using a "Siamese" Time Delay Neural Network", Advances in Neural Information Processing Systems, 1994, 737-744.
Chopra et al., "Learning a Similarity Metric Discriminatively, with Application to Face Verification", CVPR, Jun. 2005, 8 pages.
Choromanska et al., "Extreme Multi Class Classification", NIPS Workshop: eXtreme Classification, 2013, 9 pages.
Choy et al., "Universal Correspondence Network", Advances in Neural Information Processing Systems 29 (NIPS 2016), 9 pages.
Das et al., "Submodular meets Spectral: Greedy Algorithms for Subset Selection, Sparse Approximation and Dictionary Selection", arXiv:1102.3975v2, Feb. 25, 2011, 22 pages.
Hadsell et al., "Dimensionality Reduction by Learning an Invariant Mapping", IEEE Computer Society Conference on Computer Vision and Pattern Recognition (CVPR), 2006, 8 pages.
He et al., "Deep Residual Learning for Image Recognition", Proceedings of the IEEE Conference on Computer Vision and Pattern Recognition, 2016, 9 pages.
Hershey et al., "Deep Clustering: Discriminative Embeddings for Segmentation and Separation", arXiv:1508.04306v1, Aug. 18, 2015, 10 pages.
Ioffe et al., "Batch Normalization: Accelerating Deep Network Training by Reducing Internal Covariate Shift", arXiv:1502.03167v3, Mar. 2, 2015, 11 pages.
Ionescu et al., "Training Deep Networks with Structured Layers by Matrix Backpropagation", arXiv:1509.07838v4, Apr. 14, 2016, 20 pages.
Jegou et al., "Product Quantization for Nearest Neighbor Search", IEEE Transactions on Pattern Analysis and Machine Intelligence, 2011, 33(1):117-128.
Joachims et al., "Cutting-plane training on structural SVMs", Machine Learning, 2009, 77(1):27-59.
Kaufman et al., "Clustering by means of medoids", Statistical Data Analysis Based on the L1-Norm and Related Methods, 1987, 12 pages.
Kleiner et al., "The Big Data Bootstrap", Proceedings of the 29th International Conference on Machine Learning, 2012, 8 pages.
Krause et al., "3d Object Representations for Fine-Grained Categorization," IEEE International Conference on Computer Vision (ICCV), 3dRR-13, 2013, 8 pages.
Krause et al., "Submodular Function Maximization", Tractability: Practical Approached to Hard Problems, 2012, 3(19):8.
Krizhevsky et al., "ImageNet Classification with Deep Convolutional Neural Networks", Advances in Neural Information Processing Systems, 2012, 1097-1105.
Lin and Bilmes, "Learning mixtures of submodular shells with application to document summarization," in UAI, 2012, 12 pages.
Liu et al, "Distance Metric Learning: A Comprehensive Survey" Mar. 19, 2006, retrieved from: URL<https://www.cs.cmu.edu/liuy/frame_survey_v2.pdf>, 51 pages.
Manning et al., "Introduction to Information Retrieval", Natural Language Engineering, 2008, 16(1):581 pages.
Mirzasoleiman et al., "Lazier than lazy Greedy", Proceedings of the 29th AAAI Conference on Artificial Intelligence, 2015, 7 pages.
Oh et al, "Deep Metric Learning via Lifted Structured Feature Embedding", IEEE Conference on Computer Vision and Pattern Recognition, Jun. 27, 2016, 9 pages.
PCT International Preliminary Report on Patentability in International Application No. PCT/US2017/061853, dated May 21, 2019, 11 pages.
PCT International Search Report and Written Opinion in International Application No. PCT/US2017/061853, dated Mar. 12, 2018, 16 pages.
Prabhu et al., "FastXML: A fast, accurate and stable tree classifier for eXtreme multi label learning" Proceedings of the 20th ACM SIGKDD International Conference on Knowledge Discovery and Data Mining, 2014, 10 pages.
Russakovsky et al., "ImageNet Large Scale Visual Recognition Challenge", arXiv:1409.0575v3, Jan. 30, 2015, 43 pages.
Schroff et al., "FaceNet: A Unified Embedding for Face Recognition and Clustering", IEEE Conference on Computer Vision and Pattern Recognition (CVPR), 2015, 815-823.
Schultz et al., "Learning a Distance Metric from Relative Comparisons", Advances in Neural Information Processing Systems, 2004, 41-48.
Sener et al., "Learning Transferrable Representations for Unsupervised Domain Adaption" Advances in Neural Information Processing Systems 29 (NIPS 2016), 9 pages.
Simonyan et al., "Very deep convolutional networks for large scale image recognition", arXiv:1409.1556v6, Apr. 10, 2015, 14 pages.
Sohn, "Improved Deep Metric Learning with Multi-class N-pair Loss Objective", Advances in Neural Information Processing Systems 29 (NIPS 2016), 9 pages.
Song et al., "Deep Metric Learning via Lifted Structured Feature Embedding", IEEE Conference on Computer Vision and Pattern Recognition (CVPR), 2016, 4004-4012.
Szegedy et al., "Going Deeper with Convolutions", IEEE Conference on Computer Vision and Pattern Recognition (CVPR), Jan. 9, 2015.
Tschiatschek et al., "Learning mixtures of submodular functions for image collection summarization", Advances in Neural Information Processing Systems 27 (NIPS 2014), 9 pages.
Tsochantaridis et al, "Support vector machine learning for interdependent and structured output spaces", Proceedubgs of the 21st International Conference on Machine Learning, 2004, 8 pages.
Van der Maaten, "Accerlerating t-SNE using Tree based Algorithms", Journal of Machine Learning Research 15, 2014, 3221-3245.
Wah et al., "The Caltech-UCSD Birds-200-2011 Dataset", Computation and Neural Systems Technical report, Oct. 2011, 8 pages.
Wang et al., "Unsupervised Learning of Visual Representations Using Videos", IEEE International Conference on Computer Vision (ICCV), 2015, 2794-2802.
Weinberger et al., "Distance Metric Learning for Large Margin Nearest Neighbor Classification", Journal of Machine Learning Research Oct. 2009, 207-244.
Xie et al, "Unsupervised Deep Embedding for Clustering Analysis" arXiv, May 26, 2016, 10 pages.
Yen et al., "PD-Sparse: A Primal and Dual Sparse Approach to Extreme Multiclass and Multilabel Classification", Proceedings of the 33rd International Conference on Machine Learning, 2016, 9 pages.

(56) References Cited

OTHER PUBLICATIONS

Zheng et al., "Improving the Robustness of Deep Neural Networks via Stability Training", IEEE Conference on Computer Vision and Pattern Recognition (CVPR), 2016, 4480-4488.
EP Office Action in European Application No. 17817337.3, dated Apr. 13, 2021, 12 pages.
CN Office Action in Chinese Appln. No. 201780070400.1, dated Sep. 1, 2022, 30 pages (with English Translation).
Ding et al., "Hot Strip Width Prediction During Rough Rolling with PSO-Neural Network Based on Fuzzy Clustering," Journal of Northeastern University, Sep. 30, 2007, 4 pages (with English Abstract).
Office Action in Chinese Appln. No. 201780070400.1, dated Jan. 19, 2023, 7 pages (with English Translation).

\* cited by examiner

TRAINING NEURAL NETWORKS USING A CLUSTERING LOSS

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that trains a neural network that has network parameters and that is configured to receive an input data item and to process the input data item to generate an embedding of the input data item in accordance with the network parameters. In some specific, non-limiting examples, the neural network trained in the manner described herein may be used for image classification.

Particular embodiments of the subject matter described in this specification can be implemented so as to realize one or more of the following advantages. By training a neural network as described in this specification, i.e., by training the neural network to optimize the described objective, the trained neural network can generate embeddings that more accurately reflect the similarity between network inputs. In particular, by training the neural network as described in this specification, the embeddings generated by the trained neural network can be effectively used as features or representations of the network inputs for a variety of tasks, including feature based retrieval, clustering, near duplicate detection, verification, feature matching, domain adaptation, video based weakly supervised learning, and so on.

In some specific examples, a neural network trained in accordance with the training method described herein may be used for image classification. More specifically, in these examples, by training the neural network in this manner, the embeddings generated by the neural network can be effectively used in large scale classification tasks, i.e., tasks where the number of classes is very large and the number of examples per class becomes scarce. In this setting, any direct classification or regression methods become impractical due to the prohibitively large number of classes. The described training techniques, however, allow the embeddings generated by the trained neural network to be used to accurately classify network inputs into one of the classes, e.g., by representing each class with a respective medoid and determining the medoid that is closest to the embedding of the network input.

Additionally, many conventional approaches to training neural networks to generate embeddings require computationally intensive pre-processing of the training data before it can be used to train the neural network. For example, many existing techniques require a separate data preparation stage in which the training data has to be first prepared in pairs, i.e., with each pair including a positive and a negative example, in triplets, i.e., with each triplet including an anchor example, a positive example, and a negative example, or in n-pair tuples format, before the training data can be used for training. This procedure has very expensive time and space cost as it often requires duplicating the training data and needs to repeatedly access the disk to determine how to format the training examples. By contrast, the training technique described in this specification requires little to no pre-processing before a batch of training items is used in training, reducing the computational cost and time required for training the neural network while still, as described above, training the network to effectively generate embeddings.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
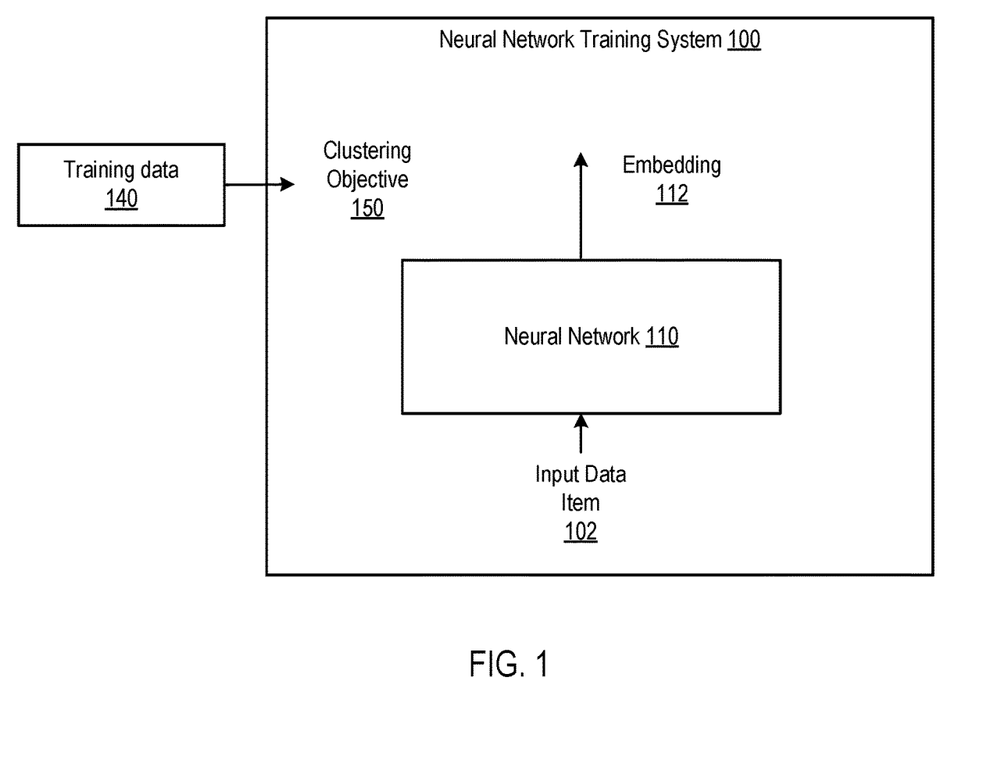
FIG. 1 shows an example neural network training system.

FIG. 1 shows an example neural network training system 100. The neural network training system 100 is an example of a system implemented as computer programs on one or more computers in one or more locations, in which the systems, components, and techniques described below can be implemented.

The neural network training system 100 is a system that trains a neural network 110 on training data 140 to determine trained values of the parameters of the neural network 110, referred to in this specification as network parameters, from initial values of the network parameters.

The neural network 110 is a neural network that is configured to receive an input data item 102 and to process the input data item to generate an embedding 112 of the input data item 102 in accordance with the network parameters. Generally, an embedding of a data item is an ordered collection of numeric values, e.g., a vector, that represents the data item. In other words, each embedding is a point in a multi-dimensional embedding space. Once trained, the positions of embeddings in the multi-dimensional space generated by the neural network 110 can reflect similarities between the data items that the embeddings represent.

The neural network 110 can be configured to receive as input any kind of digital data input and to generate an embedding from the input. For example, the input data items, also referred to as network inputs, can be images, portions of documents, text sequences, audio data, and so on.

The neural network 110 can have any architecture that is appropriate for the type of network inputs processed by the neural network 110. For example, when the network inputs are images, the neural network 110 can be a convolutional neural network. For example, the embeddings can be the outputs of an intermediate layer of a convolutional neural network that has been pre-trained for image classification, e.g., the Inception network described in C. Szegedy, W. Liu, Y. Jia, P. Sermanet, S. Reed, D. Anguelov, D. Erhan, V. Vanhoucke, and A. Rabinovich, Going deeper with convolutions, in CVPR, 2015.

Once trained, the embeddings generated by the network 110 can be used for any of a variety of purposes.

For example, the system 100 can provide embeddings generated by the trained neural network as input to another system as features of the corresponding network inputs, e.g., for use in performing a machine learning task on the network inputs. Example tasks may include feature based retrieval, clustering, near duplicate detection, verification, feature matching, domain adaptation, video based weakly supervised learning, and so on.

As another example, the system 100 can use an embedding generated by the trained neural network to classify the corresponding network input. In particular, the system can maintain data identifying a respective metoid, i.e., a respective representative point in the embedding space, for each of a set of multiple possible classes. The system 100 can then classify a network input as belonging to the class represented by the metoid that is closest to the embedding generated for the network input by the trained neural network.

The training data 140 that is used by the system 100 to train the neural network 110 includes multiple batches of training inputs and a ground truth clustering assignment for the training inputs. The ground truth clustering assignment assigns each training input into a respective cluster of a set of clusters. For example, in the classification context, the set of clusters can include a respective cluster for each possible category or class into which a network input can be classified and the ground truth assignment assigns each data item to the cluster for the category or class into which the data item should be classified.

The system 100 trains the neural network 110 on the training data 140 by optimizing a clustering objective 150. In particular, the clustering objective 150 is an objective that, for a given batch of multiple training inputs, penalizes the neural network 110 for generating embeddings that do not result in, for each possible clustering assignment other than the ground truth assignment for the batch, an oracle clustering score for the batch being higher than a clustering score for the possible clustering assignment by at least a structured margin between the possible clustering assignment and the ground truth assignment.

Each possible clustering assignment defines a clustering of the training examples in the batch by specifying a set of cluster medoids, i.e., a set of representative points in the embedding space, that includes one medoid for each cluster in the set of clusters. The clustering assignment then assigns each training item in the batch to the medoid that is closest to the embedding for the training item.

The clustering score (also referred to as a facility location score) for a given clustering assignment measures how close the embeddings for the training items in the batch each are to the closest medoid to the embedding. In particular, in some implementations, the facility location function F that generates the clustering scores satisfies:

$$F(X, S; \theta) = -\sum_{i \in |X|} \min_{j \in S} \|f(X_i; \theta) - f(X_j; \theta)\|,$$

where $|X|$ is the total number of training inputs X in the batch, the sum is a sum over all of the training inputs in the batch, S is the set of medoids in the given clustering assignment, and, for the i-th training input $X_i$, $f(X_i;\theta)$ is the embedding of the training input generated in accordance with the network parameters $\theta$ and $$\min_{j \in S} \|f(X_i; \theta) - f(X_j; \theta)\|$$

is the distance from the closest medoid in the set of medoids to the embedding of the training input.

The oracle clustering score measures the quality of the clustering of the training examples in the batch given the ground truth clustering assignment and the network parameters, i.e., the quality of the clustering defined by the embeddings for the training inputs in the batch generated in accordance with the network parameters. In particular, the oracle clustering function $\tilde{F}$ that generates the oracle clustering score is expressed as:

$$\tilde{F}(X, y^*; \theta) = \sum_k^{|Y|} \max_{j \in \{i : y^*[i]=k\}} F(X_{[i:y^*[i]=k]}, \{j\}; \theta)$$

where $|Y|$ is the total number of clusters in the ground truth clustering assignment $y^*$, the sum is a sum over all of the clusters in the ground truth clustering assignment, $i:y^*[i]=k$ is the subset of the training examples in the batch that are clustered into cluster k by the ground truth clustering assignment, and, for the cluster k, $$\max_{j \in \{i : y^*[i]=k\}} F(X_{[i:y^*[i]=k]}, \{j\}; \theta)$$

is the largest clustering score for only the training items in the cluster k from among the clustering scores generated when the medoid for the cluster k is any of the embeddings for any of the training items in the cluster k.

The structured margin between a given possible clustering assignment and the ground truth clustering assignment measures a quality of the possible clustering assignment relative to the ground truth assignment. In particular, in some implementations, the structured margin is based on a normalized mutual information measure between the possible clustering assignment and the ground truth assignment. In particular, in these implementations, the structured margin $\Delta$ between a cluster assignment y and the ground truth assignment $y^*$ is expressed as:

$$\Delta(y,y^*)=1-NMI(y,y^*),$$

where NMI(y,y*) is the normalized mutual information between the two assignments and satisfies:

$$NMI(y, y^*) = \frac{MI(y, y^*)}{\sqrt{H(y)H(y^*)}},$$

where MI is the mutual information between the two assignments and H is the entropy of an assignment.

Generally, both the mutual information and the entropy are based on marginal probabilities of clusters in the two assignments and joint probabilities between one cluster in one assignment and another cluster in the other assignment. The marginal probability used for computing the entropy and the mutual information can be estimated as, for a given cluster and a given assignment, the fraction of the training items that are assigned to the given cluster by the given assignment. The joint probability used for computing the entropy and the mutual information between a cluster i in a first assignment and a cluster j in a second assignment can be estimated as the fraction of the training items that are assigned to the cluster i by the first assignment and to the cluster j by the second assignment.

The clustering loss function for a batch of training inputs X and a ground truth clustering assignment y* for the batch can then satisfy:

$$l(X, y^*) = \left[\max_S \{F(X, S; \theta) + \gamma \Delta(g(S), y^*)\} - \tilde{F}(X, y^*; \theta)\right]_+,$$

where the maximum is over the possible clustering assignments, i.e., possible sets of medoids that have the same number of medoids as there are clusters in the ground truth assignment, γ is a positive constant value, g(S) is a function that assigns each training item to the cluster that is represented by the closest medoid in the assignment S to the embedding for the training item, and $[\alpha]_+$ equals zero if α is less than or equal to zero and α if α is greater than zero. The term F(X,S;θ)+γΔ(g(S),y*) for a given clustering assignment will be referred to in this specification as the augmented clustering score for the clustering assignment.

Training the neural network on this objective is described in more detail below with reference to FIGS. 2 and 3.

Once the neural network has been trained, the system 100 provides data specifying the trained neural network for use in processing new network inputs. That is, the system 100 can output, e.g., by outputting to a user device or by storing in a memory accessible to the system 100, the trained values of the network parameters for later use in processing inputs using the trained neural network. Alternatively or in addition to outputting the trained neural network data, the system 100 can instantiate an instance of the neural network having the trained values of the network parameters, receive inputs to be processed, e.g., through an application programming interface (API) offered by the system, use the trained neural network to process the received inputs to generate embeddings, and then provide the generated embeddings in response to the received inputs.

Figure 2:
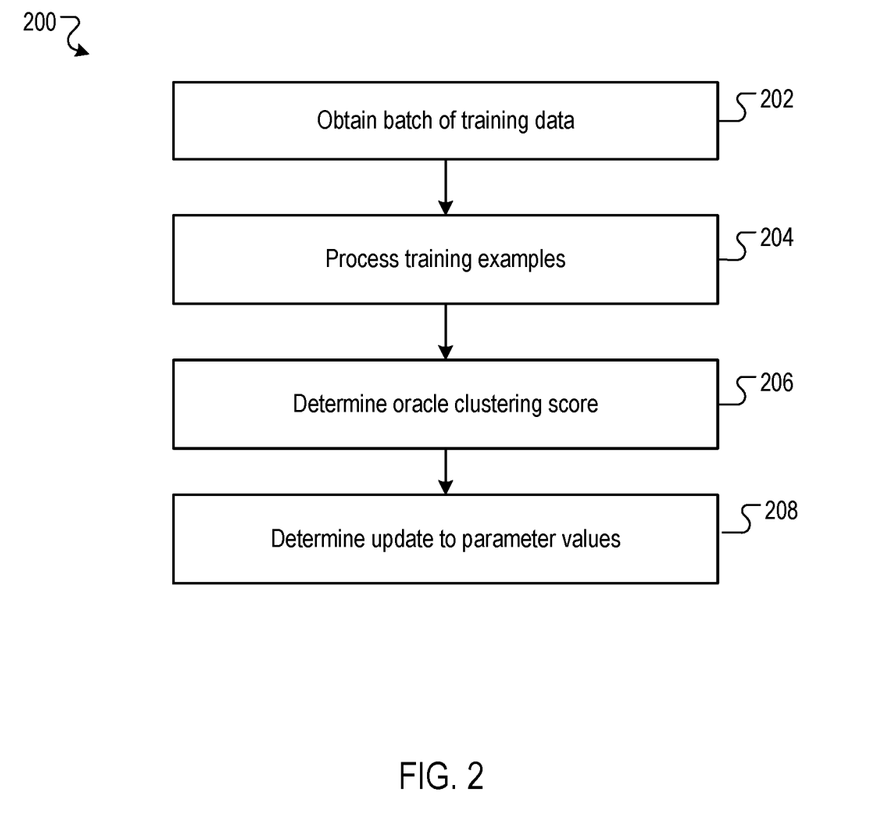
FIG. 2 is a flow diagram of an example process for training a neural network using a clustering loss.

FIG. 2 is a flow diagram of an example process 200 for training a neural network on a batch of training data. For convenience, the process 200 will be described as being performed by a system of one or more computers located in one or more locations. For example, a neural network training system, e.g., the neural network training system 100 of FIG. 1, appropriately programmed, can perform the process 200.

The system can perform the process 200 multiple times for multiple different batches of training items to determine trained values of the network parameters from initial values of the network parameters.

The system obtains a batch of training items and a ground truth assignment of the training items in the batch into a plurality of clusters (step 202). The ground truth assignment assigns each training item in the batch to a respective cluster from the set of clusters.

The system processes each training item in the batch using the neural network and in accordance with current values of the network parameters to generate a respective embedding for each of the training items (step 204).

The system determines an oracle clustering score for the ground truth assignment based on the embeddings for the training items in the batch (step 206). As described above, the oracle clustering score measures the quality of the clustering given the ground truth clustering assignment and the network parameters, i.e., of the clustering defined by the embeddings generated in accordance with the current values of the network parameters.

The system adjusts the current values of the network parameters by performing an iteration of a neural network training procedure to optimize, i.e., minimize, the clustering objective using the oracle clustering score (step 208). Generally, the training procedure determines an update to the current values of the parameters from a gradient of the clustering objective with respect to the parameters and then applies, e.g., adds, the update to the current values to determine updated values of the parameters. For example, the training procedure can be stochastic gradient descent and the system can multiply the gradient by a learning rate to determine the update and then add the update to the current values of the network parameters. Determining the gradient of the clustering objective is described in more detail below with reference to FIG. 3.

Figure 3:
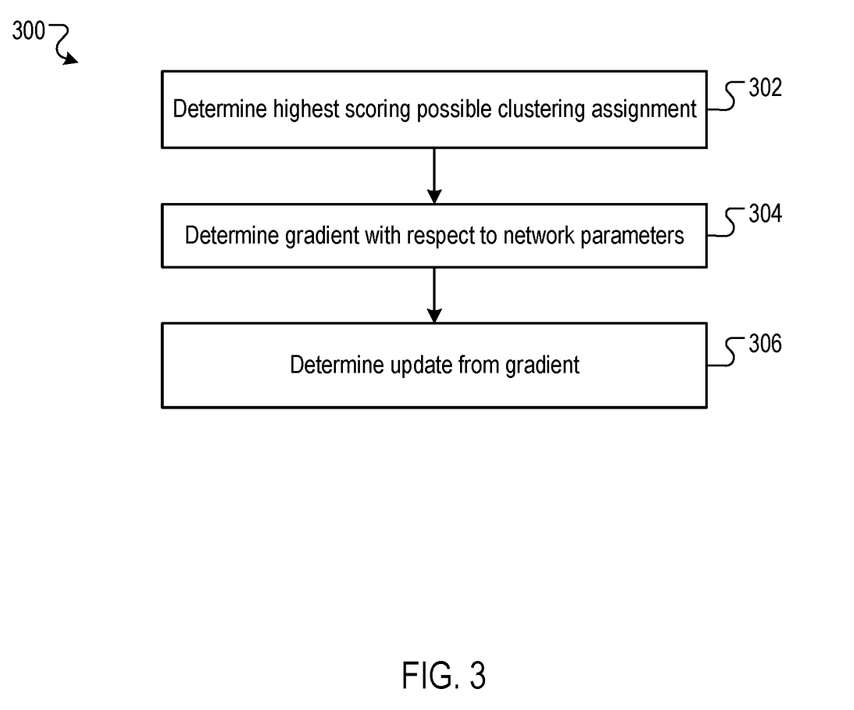
FIG. 3 is a flow diagram of an example process for determining an update to current values of the parameters of the neural network.

FIG. 3 is a flow diagram of an example process 300 for determining an update to current values of the network parameters. For convenience, the process 300 will be described as being performed by a system of one or more computers located in one or more locations. For example, a neural network training system, e.g., the neural network training system 100 of FIG. 1, appropriately programmed, can perform the process 300.

The system can perform the process 300 during the training of the neural network on a batch of training inputs to determine an update to the current values of the network parameters for the batch. The system can then apply, i.e., add, the updates determined for the inputs in the batch to generate updated values of the network parameters.

The system determines the possible clustering assignment other than the ground truth assignment that has the highest augmented clustering score (step 302).

As described above, the augmented clustering score is the clustering score for the possible clustering assignment plus the structured margin between the possible clustering assignment and the ground truth assignment.

In some implementations, to determine the highest scoring clustering assignment, the system determines an initial best possible clustering assignment using an iterative loss augmented inference technique. In particular, at each iteration of the inference technique, the system adds a new medoid to the clustering assignment. That is, the system starts with a clustering assignment that has zero medoids, i.e., does not assign any embeddings to any clusters, and continues adding medoids until the number of medoids in the clustering assignment equals the number of medoids, i.e., number of clusters, in the ground truth assignment.

At each step of the inference technique, the system adds to the current clustering assignment the medoid that most increases the augmented clustering score for the clustering assignment.

The system then modifies the initial best possible clustering assignment using a loss augmented refinement technique to determine the highest scoring possible clustering assignment. In particular, the system performs multiple iterations of the refinement technique to determine the highest scoring possible clustering assignment from the initial best possible clustering assignment.

At each iteration and for each cluster in a current best possible clustering assignment, the system determines whether modifying the current best possible clustering assignment by performing a pairwise exchange of a current medoid for the cluster with an alternative point in the same cluster according to the current best possible clustering assignment would increase the augmented clustering score for the clustering assignment, and, if so, swaps the current medoid for the alternative point to update the clustering assignment.

The number of iterations of the loss augmented refinement technique to be performed may be fixed, e.g., to three, five, or seven iterations, or the system may continue performing the technique until none of the pointwise swaps would improve the augmented clustering scores.

In some implementations, for both the iterative loss augmented inference technique and the loss augmented refinement technique, the system considers as candidate medoids only the embeddings for the training items in the batch. In some other implementations, the system also considers also points in the embedding space that are not embeddings of training items in the batch, e.g., the entire space of possible points in the space or a predetermined discrete subset of possible points.

The system determines a gradient of the clustering objective with respect to the network parameters using the highest scoring clustering assignment (step 304).

In particular, the system can determine the gradient as the difference between the gradient of the augmented clustering scoring function term of the objective function with respect to the network parameters and the gradient of the oracle scoring function term of the objective function with respect to the network parameters. That is, the total gradient is a first gradient term, i.e., the gradient of augmented clustering scoring function, minus a second gradient term, i.e., the gradient of the oracle scoring function.

More specifically, the first gradient term satisfies:

$$-\sum_{i\in|X|}\left[\frac{f(X_i;\theta)-f(X_{j^*(i)};\theta)}{\|f(X_i;\theta)-f(X_{j^*(i)};\theta)\|}\cdot\nabla_\theta(f(X_i;\theta)-f(X_{j^*(i)};\theta))\right],$$

where the sum is a sum over all of the training inputs in the batch, $f(X_i;\theta)$ is the embedding of the i-th training input $X_i$, $f(X_{j^*(i)};\theta)$ is the closest medoid to the embedding $f(X_i;\theta)$ from the medoids in the highest scoring assignment, and $\nabla_\theta(f(X_i;\theta)-f(X_{j^*(i)};\theta))$ is the gradient with respect to the network parameters of $f(X_i;\theta)-f(X_{j^*(i)};\theta)$.

The second gradient term satisfies:

$$\sum_k \nabla_\theta F(X_{\{i:y^*[i]=k\}}, \{j^*(k)\}; \theta)$$

where the sum is over the clusters in the ground truth assignment, and $F(X_{\{i:y^*[i]=k\}}, \{j^*(k)\};\theta)$ is the clustering score for the training inputs that are assigned to cluster k by the ground truth clustering assignment relative to the medoid for the cluster k in the highest scoring assignment.

The system can determine the gradients in the first gradient term and the second gradient term with respect to all of the parameters of the neural network using conventional neural network training techniques, i.e., by backpropagating gradients through the neural network.

In some implementations, the system only computes the gradient as above if the loss for the batch, i.e., the value of the clustering loss function l(X, y*) for the batch, is greater than zero. If the loss is less than or equal to zero, the system sets the gradients to zero and does not update the current values of the network parameters.

The system then determines an update to the current values of the network parameters from the gradient of the clustering objective (step 306). For example, the system can determine the update by applying a learning rate to the gradient.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, .e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method, the method comprising:
   training a neural network to perform an image processing task by receiving and processing an input image, wherein the neural network has a plurality of network parameters and is configured to generate an embedding of the input image in accordance with the network parameters, wherein training the neural network comprises, at each of plurality of training iterations:
      obtaining a batch of training images for the training iteration and a ground truth assignment of the training images in the batch into a plurality of clusters;
      processing the training images in the batch using the neural network and in accordance with current values of the network parameters to generate respective embeddings for each of the training images;
      determining an oracle clustering score for the ground truth assignment based on the respective embeddings;
         wherein the oracle clustering score measures a quality of the ground truth assignment based on the respective embeddings of each of the training images in the batch;
      determining, from a plurality of clustering assignments, a possible clustering assignment other than the ground truth assignment that has a highest augmented clustering score, wherein:
         each clustering assignment assigns the training images in the batch into a respective plurality of clusters that are each represented by a respective medoid,
         the augmented clustering score is a clustering score for the possible clustering assignment plus a structured margin between the possible clustering assignment and the ground truth assignment,
         the clustering score for a clustering assignment measuring for each embedding of the training inputs, how close the embedding is to a closest medoid to the embedding, and
         the structured margin measures a quality of the possible clustering assignment relative to the ground truth assignment; and
      training the neural network using the possible clustering assignment other than the ground truth assignment that has a highest augmented clustering score to update the current values of the network parameters;
   after training the neural network, performing, using the neural network, the image processing task on a new input image, wherein the image processing task comprises at least one of image classification, feature based retrieval, image clustering, near duplicate image detection, feature matching, domain adaptation, or video based weakly supervised learning.

2. The method of claim 1, wherein the structured margin is based on a normalized mutual information measure between the possible clustering assignment and the ground truth assignment.

3. The method of claim 1, wherein determining the possible clustering assignment other than the ground truth assignment that has the highest augmented clustering score comprises:
   determining an initial best possible clustering assignment using an iterative loss augmented inference technique.

4. The method of claim 3, wherein determining the initial best possible clustering assignment using the iterative loss augmented inference technique comprises:
   at each step of the inference technique, adding a medoid to the clustering assignment that most increases the augmented clustering score.

5. The method of claim 3, wherein
   determining the possible clustering assignment other than the ground truth assignment that has the highest augmented clustering score comprises:
   modifying the initial best possible clustering assignment using a loss augmented refinement technique to determine the possible clustering assignment other than the ground truth assignment that has the highest augmented clustering score.

6. The method of claim 5, wherein modifying the initial best possible clustering assignment using the loss augmented refinement technique comprises:
   performing a pairwise exchange of a current medoid in a current best possible clustering assignment with an alternative point in the same cluster according to the current best possible clustering assignment; and
   swapping the current medoid for the alternative point if the pairwise exchange increases the augmented clustering score.

7. The method of claim 1, wherein performing the iteration of the neural network training procedure further comprises:
  determining a gradient of the objective function with respect to the network parameters using the possible clustering assignment other than the ground truth assignment that has a highest augmented clustering score; and
  determining an update to the current values of the network parameters using the gradient.

8. The method of claim 1, further comprising:
  determining the oracle clustering score using a facility location scoring function.

9. The method of claim 1, wherein the neural network training procedure is stochastic gradient descent.

10. The method of claim 1, further comprising:
  providing the trained neural network for use in generating embeddings for new input data items.

11. A system comprising one or more computers and one or more storage devices storing instructions that when executed by the one or more computers cause the one or more computers to perform operations, the operations comprising:
  training a neural network to perform an image processing task by receiving and processing an input image, wherein the neural network has a plurality of network parameters and is configured to generate an embedding of the input image in accordance with the network parameters, wherein training the neural network comprises, at each of plurality of training iterations:
    obtaining a batch of training images for the training iteration and a ground truth assignment of the training images in the batch into a plurality of clusters;
    processing the training images in the batch using the neural network and in accordance with current values of the network parameters to generate respective embeddings for each of the training images;
    determining an oracle clustering score for the ground truth assignment based on the respective embeddings;
      wherein the oracle clustering score measures a quality of the ground truth assignment based on the respective embeddings of each of the training images in the batch;
    determining, from a plurality of clustering assignments, a possible clustering assignment other than the ground truth assignment that has a highest augmented clustering score, wherein:
      each clustering assignment assigns the training images in the batch into a respective plurality of clusters that are each represented by a respective medoid,
      the augmented clustering score is a clustering score for the possible clustering assignment plus a structured margin between the possible clustering assignment and the ground truth assignment,
      the clustering score for a clustering assignment measuring for each embedding of the training inputs, how close the embedding is to a closest medoid to the embedding, and
      the structured margin measures a quality of the possible clustering assignment relative to the ground truth assignment; and
    training the neural network using the possible clustering assignment other than the ground truth assignment that has a highest augmented clustering score to update the current values of the network parameter;
  after training the neural network, performing, using the neural network, the image processing task on a new input image, wherein the image processing task comprises at least one of image classification, feature based retrieval, image clustering, near duplicate image detection, feature matching, domain adaptation, or video based weakly supervised learning.

12. One or more non-transitory computer-readable storage media storing instructions that when executed by one or more computers cause the one or more computers to perform operations, the operations comprising:
  training a neural network to perform an image processing task by receiving and processing an input image, wherein the neural network has a plurality of network parameters and is configured to generate an embedding of the input image in accordance with the network parameters, wherein training the neural network comprises:
    obtaining a batch of training images and a ground truth assignment of the training images in the batch into a plurality of clusters;
    processing the training images in the batch using the neural network and in accordance with current values of the network parameters to generate respective embeddings for each of the training images;
    determining an oracle clustering score for the ground truth assignment based on the respective embeddings; and
      wherein the oracle clustering score measures a quality of the ground truth assignment based on the respective embeddings of each of the training images in the batch;
    determining, from a plurality of clustering assignments, a possible clustering assignment other than the ground truth assignment that has a highest augmented clustering score, wherein:
      each clustering assignment assigns the training images in the batch into a respective plurality of clusters that are each represented by a respective medoid,
      the augmented clustering score is a clustering score for the possible clustering assignment plus a structured margin between the possible clustering assignment and the ground truth assignment,
      the clustering score for a clustering assignment measuring for each embedding of the training inputs, how close the embedding is to a closest medoid to the embedding, and
      the structured margin measures a quality of the possible clustering assignment relative to the ground truth assignment; and
    training the neural network using the possible clustering assignment other than the ground truth assignment that has a highest augmented clustering score to update the current values of the network parameter;
  after training the neural network, performing, using the neural network, the image processing task on a new input image, wherein the image processing task comprises at least one of image classification, feature based retrieval, image clustering, near duplicate image detection, feature matching, domain adaptation, or video based weakly supervised learning.

* * * * *

UNITED STATES PATENT AND TRADEMARK OFFICE
CERTIFICATE OF CORRECTION

| | |
|---|---|
| PATENT NO. | : 11,636,314 B2 |
| APPLICATION NO. | : 16/349888 |
| DATED | : April 25, 2023 |
| INVENTOR(S) | : Song |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 797 days.

Signed and Sealed this
Twentieth Day of February, 2024

Katherine Kelly Vidal
*Director of the United States Patent and Trademark Office*